United States Patent
Yu et al.

(10) Patent No.: US 8,902,377 B2
(45) Date of Patent: Dec. 2, 2014

(54) LIQUID CRYSTAL DISPLAY DEVICE AND BACKLIGHT MODULE THEREOF

(75) Inventors: Yajun Yu, Shenzhen (CN); Yu-chun Hsiao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 251 days.

(21) Appl. No.: 13/578,620

(22) PCT Filed: Jul. 20, 2012

(86) PCT No.: PCT/CN2012/078914
§ 371 (c)(1),
(2), (4) Date: Aug. 11, 2012

(87) PCT Pub. No.: WO2014/012239
PCT Pub. Date: Jan. 23, 2014

(65) Prior Publication Data
US 2014/0022488 A1   Jan. 23, 2014

(30) Foreign Application Priority Data
Jul. 17, 2012   (CN) .......................... 2012 1 0247384

(51) Int. Cl.
*G02F 1/1333* (2006.01)

(52) U.S. Cl.
USPC ............................................ 349/58; 349/60

(58) Field of Classification Search
USPC ...................................... 349/58, 60
See application file for complete search history.

(56) References Cited

U.S. PATENT DOCUMENTS

| 6,992,736 B2 * | 1/2006 | Saito et al. ....................... 349/58 |
| 7,724,316 B2 * | 5/2010 | Maruyama et al. ............. 349/58 |
| 2006/0007708 A1 * | 1/2006 | Lee ................................ 362/632 |
| 2007/0241991 A1 * | 10/2007 | Tsai .................................. 345/7 |

* cited by examiner

*Primary Examiner* — Wen-Ying P Chen
(74) *Attorney, Agent, or Firm* — Andrew C. Cheng

(57) ABSTRACT

The present invention provides a backlight module which comprises a waveguide, an optical film, an elastic frame, and dowel pins. Wherein at least corners of the optical film is securely attached to the elastic frame, and wherein the dowel pints are attached to the elastic frame, and the optical film is disposed on top of the waveguide. Wherein corners of the optical film are provided with openings with which the optical films are readily positioned with respect to the waveguide by extending the dowel pins through the openings. And wherein the strength of the dowel pins is stronger than the strength of the elastic frame. The present invention further provides a liquid crystal display device incorporated with the backlight module disclosed above. By this arrangement, once the positioning of the optical films can he ensured, the optical quality of the backlight module can also be ensured.

13 Claims, 3 Drawing Sheets

LIQUID CRYSTAL DISPLAY DEVICE AND BACKLIGHT MODULE THEREOF

FIELD OF THE INVENTION

The present invention relates to a technical field of liquid crystal display, and more particularly to a liquid crystal display device and a backlight module incorporated therein.

BACKGROUND OF THE INVENTION

The existing liquid crystal display device generally includes a panel and a backlight module used to project luminous light toward the panel so as to display the patterns on the panel. The backlight module generally includes as waveguide and an optical film disposed on the light exiting surface of the waveguide. The arrangement and installation of the optical film will directly affect the quality of the backlight module.

In the current technologies, one of the measurements of arranging and positioning of the optical films is performed with the optical films are firstly positioning onto the dowel pin of the waveguide. However, the optical film can readily get loose from the dowel pin. In worse situation, when the optical film is undergone a thermal expansion, the optical film will jump out of the dowel pin suddenly and create an instant impart, to the waveguide, cracking the waveguide in which the dowel pin is installed.

The other measurement of arranging and positioning of the optical films is embodied with that the optical film is provided with four positioning holes at four corners. And then a rubber frame is applied to attach the optical film to the waveguide. The rubber frame is expected to compensate the thermal expansion of the waveguide. The rubber frame is also provided with dowel pins integrally formed with the rubber frame. As a result, the optical film can be readily deployed, over the rubber .frame. However, the optical film is comparably hard and sharp as compared to the rubber, and the dowel. pins integrally formed with the frame is also made from rubber. once the optical film is deployed over the rubber frame, the rubber dowel, pins can be readily cut off with the transversal movement of the optical film such that the optical film is lost of its support and positioning. Once the optical film is out of its intended position, the optical performance at the backlight module is negatively compromised.

SUMMARY OF THE INVENTION

It is an object of the present invention to provide a technical solution to the problems encountered by the prior art in which a liquid crystal display device and a backlight module is provided. An optical film can be readily and reliably positioned on the backlight module such that the optical quality of the backlight module is ensured.

In order to resolve the problem encountered by the prior art, the present invention provides a technical solution by introducing a backlight module which comprises a waveguide, an optical film, an elastic frame, and dowel pins. Wherein at least corners of the optical film is securely attached to the elastic frame. Wherein the dowel pints are attached to the elastic frame, and the optical film is disposed on top of the waveguide, wherein corners of the optical film is provided with openings with which the optical films are readily positioned with respect to the waveguide by extending the dowel pins through the openings. Wherein the strength of the dowel pins is stronger than the strength of the elastic frame. Wherein the elastic frame is defined with alignment holes in which the dowel pins are interferentially rooted. And wherein the elastic frame is defined with plurality of slots in a surface facing the waveguide.

Wherein the elastic frame is a rubber frame.

Wherein the dowel pin is made from stainless steel, or aluminum, or aluminum alloy, copper or iron.

Wherein there are four elastic frames arranged with respect to the corners of the waveguide, and each of the elastic frames has an L-shaped configuration to match the corner of the waveguide.

Wherein the optical film is provided with tabs corresponding to the dowel pin and the opening is defined in the tab.

In order to resolve the problem encountered by the prior an, the present invention provides a technical solution by introducing a backlight module which comprises a waveguide, an optical film, an elastic frame, and dowel pins. Wherein at least corners of the optical film is securely attached to the elastic frame. Wherein the dowel pints are attached to the elastic frame, and the optical film is disposed on top of the waveguide, wherein corners of the optical film is provided with openings with which the optical films are readily positioned with respect to the waveguide by extending the dowel pins through the openings. And wherein the strength of the dowel pins is stronger than the strength of the elastic frame.

Wherein the elastic frame is defined pith alignment holes in which the dowel pins are interferentially rooted.

Wherein the elastic frame is defined with plurality of slots in a surface facing the waveguide.

Wherein the elastic frame is a rubber frame.

Wherein the dowel pin is made from stainless steel, or alai n aluminum alloy, copper or iron.

Wherein there are four elastic frames arranged with respect to the corners of the waveguide. and each of the elastic frames has an L-shaped configuration to match the corner of the waveguide.

Wherein the optical fiber is provided with tabs corresponding to the dowel pin, and the opening is defined in the tab.

In order to resolve the problem encountered. by the prior art, the present invention provides a technical solution by introducing as liquid crystal display device Which comprises A display panel and a backlight module disposed under the display panel. The backlight module includes a waveguide, an optical film, an elastic frame, and dowel pins. Wherein at least corners of the optical film is securely attached to the elastic frame. Wherein the dowel pints are attached to the elastic frame, and the optical film is disposed on top of the waveguide, wherein corners of the optical film is provided with openings with which the optical films arc readily positioned with respect to the waveguide by extending the dowel pins through the openings. And wherein the strength of the dowel pins is stronger than the strength of the elastic frame.

Wherein the elastic frame is defined with alignment holes in which the dowel pins are interferentially rooted.

Wherein the elastic frame is defined with plurality of slots in a surface facing the waveguide.

The present invention can be concluded with the following advantages: as compared to the existing prior art, the dowel pins are securely disposed onto the elastic frame and then the optical films are then disposed onto the waveguide with its openings enveloped onto the dowel pins. Wherein the strength of the dowel pins is stronger than the strength of the elastic frame such that the dowel pins will not be cut off by the optical films. By this arrangement, once the positioning of the optical films can be ensured, the optical quality of the backlight module can also be ensured.

BRIEF DESCRIPTION OF PREFERRED EMBODIMENT

DETAILED DESCRIPTION OF PREFERRED EMBODIMENT

Figure 1:
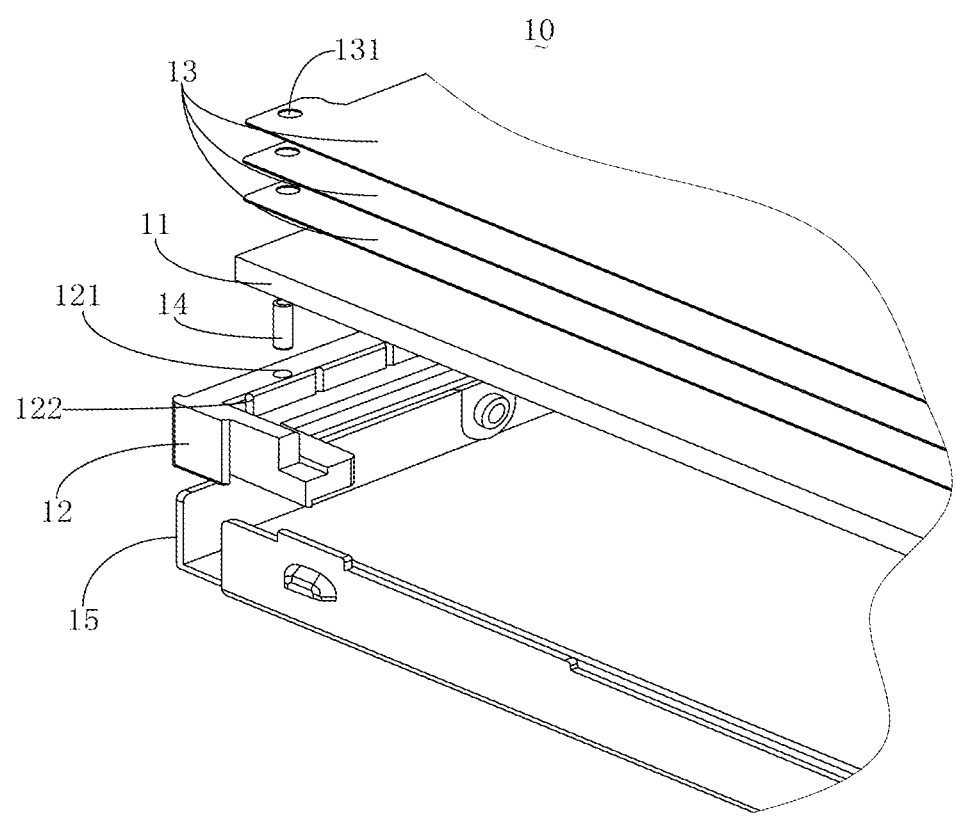
FIG. 1 is an illustrational and exploded view of a backlight module made in accordance with the present invention.

In order clearly explain the technology of the embodiment illustrated in the present invention, a brief and concise description will be given along with the accompanied drawings. Apparently, the embodiments illustrated in the drawings are merely Some typical embodiments and which can be readily modified by the skilled in the art without any additional laborious efforts so as to transform them into other drawings, and they should all be covered by the appended claims.

Figure 2:
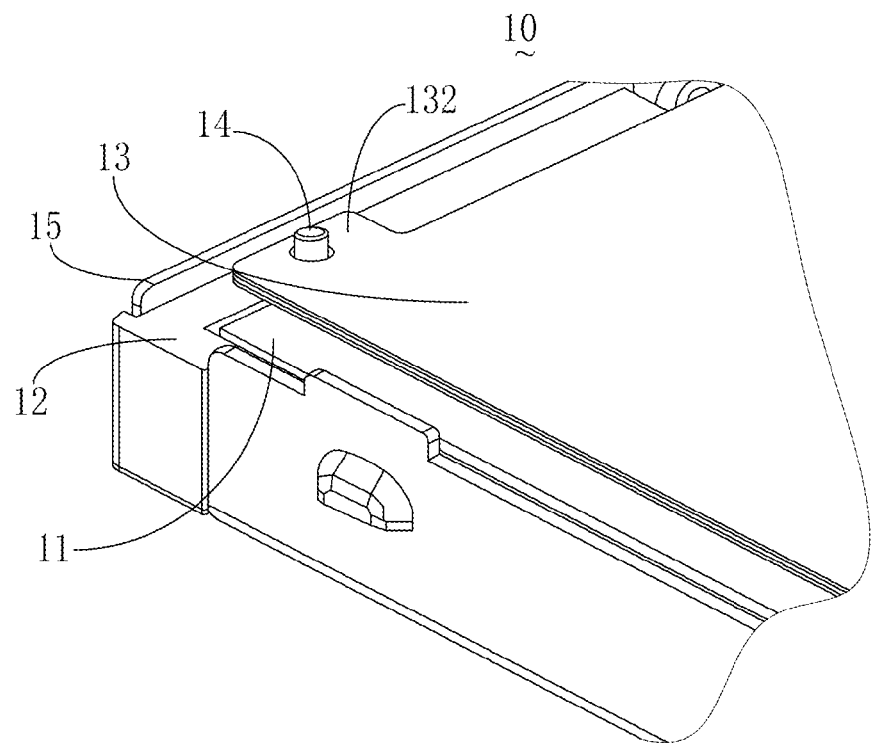
FIG. 2 is a partial and assembled view of the backlight module made in accordance with the present invention.

Referring to FIGS. 1 and 2, which are an illustrational and exploded view of a backlight module made in accordance with the present invention and a partial and assembled view of the backlight module made in accordance with the present invention, respectively.

The backlight module 10 made in accordance with the present invention includes a waveguide 11, at least an optical film 13, an elastic frame 12, and at least a dowel pin 14.

In the current embodiment, the waveguide 11 has a rectangular configuration, and the elastic frame 12 is designed with recesses arranged on sides. The recesses are designed to match with corners of the waveguide 11 such that the corners of the waveguide 11 can readily retained therein.

The dowel pin 14 is rooted on the elastic frame 12 and projects away a surface of the elastic frame 12. The optical films 13 are disposed onto the waveguide 12. Corners of the optical films 13 are defined with openings 131. The optical films 13 are sequentially disposed onto the waveguide 11 with its openings 131 each enveloped onto the dowel pins 14. By this arrangement, the optical films 13 can effectively and readily assembled to the waveguide 11 with proper alignment. In this preferred embodiment, the strength of the dowel pins 14 are stronger than the strength of the elastic frame 12 such that even there is a slight transversal movement of the optical films 13, the dowel pins 14 will not be cut off by the sharp opening 131 resulted from its shearing force. By this arrangement, the optical film 13 will not lose its alignment with respect to the waveguide 11 because it loses support from the elastic frame.

Furthermore, the optical film 13 is provided with tabs 132 corresponding to the dowel pins 14, and the opening 131 is defined in the tab 132. Accordingly, the optical film 13 can be readily positioned with respect to the waveguide 11 within the opening 131 matches with the dowel pin 14.

There are totally four (4) elastic frames 12, and each is corresponding to four corners of the waveguide 11 and is positioned onto four corners of the backframe 15. Each of the elastic frame 12 has an L-shaped configuration so as to match to the contour of the corner of the waveguide 11. The recess is defined in inner side of the elastic frame 12. In other embodiment, those four elastic frames 12 can he integrally thrilled as one piece and is attached to the backframe 15 as a whole. Accordingly, the embodiment here should not be constructed as a limitation.

Figure 3:
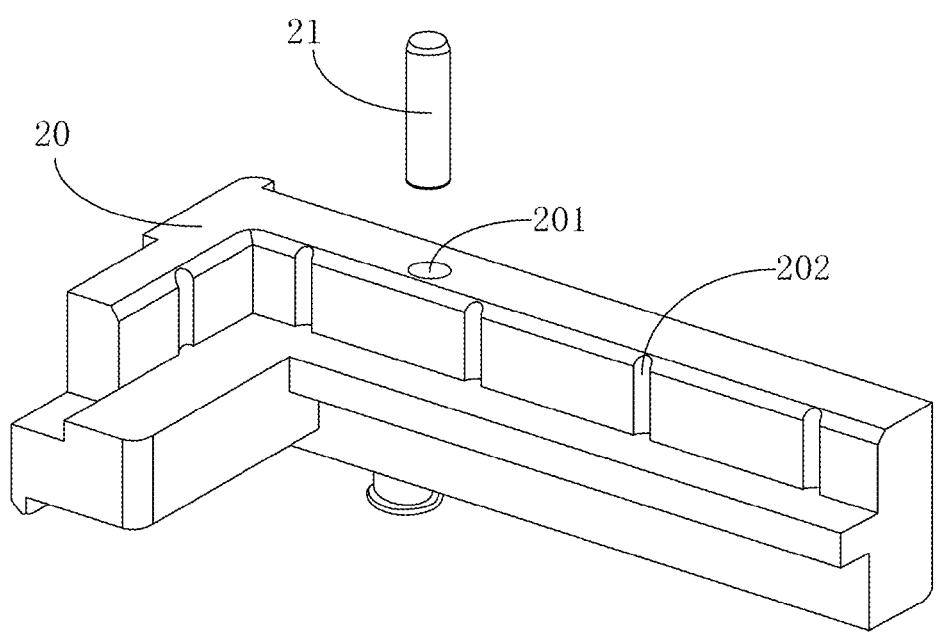
FIG. 3 is an illustrational perspective view of an elastic frame incorporated within the backlight module and FIG. 4 is an illustrational and structural view of a liquid crystal display device made in accordance with the present invention.

Referring to FIG. 3 which is an illustrational and perspective view of an elastic frame incorporated within the backlight module.

The elastic frame 20 is defined with alignment holes 201 in which the dowel pin 21 is rooted with interferential fit. It can be readily understood that in this arrangement, the diameter of the dowel pin 21 is larger than the caliber of the alignment hole 201, while the length of the dowel pin 21 is also longer than the depth of the alignment hole 201. The substantial interference fit is embodied as follow: for example, with proper tool, the dowel pin 21 can he pressed into the alignment hole 201. Alternatively, the dowel pin 21 can he frozen firstly, while the elastic frame can be heated, and then the frozen dowel pin 21 can be quickly inserted into the heated elastic frame 20. Once the dowel pin 21 and the elastic frame 20 resume to room temperature, interferential fit therebetween is completed. Alternatively, the alignment hole 201 and the dowel pin 21 can be embodied with other shape. such as a square cross section. Alternatively, the dowel pin 21 can be directly cast into the elastic frame 20 with proper molding known to the skill in the art. Since there is a variety of implementation, no limitations shall he imposed by the embodiments disclosed herewith.

In addition, in order to prevent the dowel pins from exposing additional shearing force resulted from the expansion of the waveguide, the elastic frame 20 is provided with a plurality of groove 202 in a surface facing the waveguide. The provision of the slots can readily absorb or compensate the expansion of the waveguide resulted from exposing under heat or humidity. BY this, the risk of the dowel pins being cut off because of the expansion and contraction of the waveguide is therefore avoided. The corporation of the high strength dowel pin and the slots 202 can readily benefit the stability and strength of the dowel pin. In addition, once the waveguide is properly positioned, the breakage of it can be also prevented.

In the current embodiment, the elastic frame 20 can be made from rubber or other elastic material. In the current embodiment, the dowel pin 21 is made from stainless steel, in other preferable embodiment, the dowel pin 21 can be made from other material with satisfactory rigidity, for example, aluminum, aluminum alloy, copper or iron. As a result, no limitations should be imposed on the material used herewith.

Figure 4:
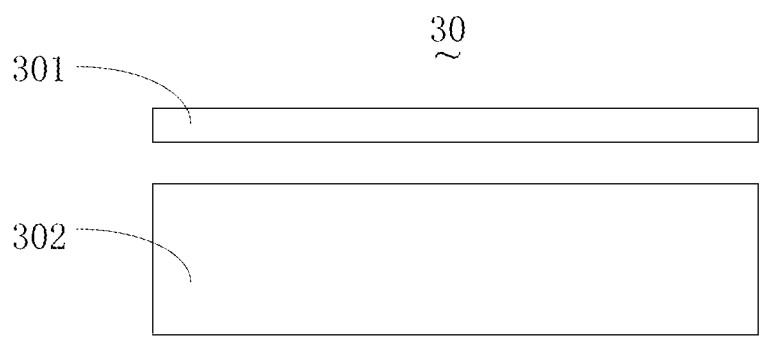

Referring to FIGS. 1 and 4, in which FIG. 4 is an illustrational and structural view of a liquid crystal display device made in accordance with the present invention.

The present invention further introduces a liquid crystal display device 30, and which includes a display panel 301, a backlight module 302 disposed behind the display panel 301. The backlight module 302 includes a waveguide 11, at least an optical film 13, an elastic frame 12, and at least a dowel pin 14. Corners of the waveguide 11 are positioned onto the elastic frame 12 which is designed with recess. The recess defined on a side of the elastic frame 12 is dimensioned such that the corner of the waveguide 11 can be readily received and positioned therein. The dowel pin 14 is disposed and projected over a top surface of the elastic frame 12. The optical film 13 is disposed on top of the waveguide 11. The corner of the optical film 13 is defined with openings 131. The plurality of optical film 13 can be readily and sequentially deployed over the waveguide 11 with the openings 131 properly enveloped onto the dowel pins 14.

Wherein the strength of the dowel pins 14 are stronger than the strength of the elastic frame 12 such that even there is a slight transversal movement of the optical films 13, the dowel pins 14 will not be cut off by the sharp opening 131 resulted from its shearing force. By this arrangement, the optical film 13 will not lose its alignment with respect to the waveguide 11 because it loses support from the elastic frame. The elastic frame 20 is defined with alignment holes 201 in which the dowel pin 21 are rooted with interferential fit. As this interferential fit has been described above, as such, no further description is given herebelow. The elastic frame 12 is defined with slots 122 in a surface facing the waveguide 11. The liquid crystal display device can be a TFT-LCD, or alternatively, it can be other liquid crystal display device.

As compared to the existing prior art, in the liquid crystal display device and its backlight module as described above, the dowel pins 14 are securely disposed onto the elastic frame 12 and then the optical films 13 are then disposed onto the waveguide 11 with its openings 131 enveloped onto the dowel pins 14. Wherein the strength of the dowel pins 14 are stronger than the strength of the elastic frame 12 such that the dowel pins 14 will not be cut off by the optical films 13. By this arrangement, once the positioning of the optical films 13 can be ensured, the optical quality of the backlight module can also be ensured.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight module, comprising:
   a waveguide, an optical film, an elastic frame, and dowel pins;
   wherein at least corners of the optical film is securely attached to the elastic frame;
   wherein the dowel pints are attached to the elastic frame, and the optical film is disposed on top of the waveguide, wherein corners of the optical film is provided with openings with which the optical films are readily positioned with respect to the waveguide by extending the dowel pins through the openings;
   wherein the strength of the dowel pins is stronger than the strength of the elastic frame;
   wherein the elastic frame is defined with alignment holes in which the dowel pins are interferentially rooted;
   wherein the elastic frame is defined with plurality of slots in a surface facing the waveguide; and
   wherein there are four elastic frames arranged with respect to the corners of the waveguide, and each of the elastic frames has an L-shaped configuration to match the corner of the waveguide.

2. The backlight module as recited in claim 1, wherein the elastic frame is a rubber frame.

3. The backlight module as recited in claim 1, wherein the dowel pin is made from stainless steel, or aluminum, or aluminum alloy, copper or iron.

4. The backlight module as recited in claim 1, wherein the optical film is provided with tabs corresponding to the dowel pin, and the opening is defined in the tab.

5. A backlight module, comprising:
   a waveguide, an optical film, an elastic frame, and dowel pins;
   wherein at least corners of the optical film is securely attached to the elastic frame;
   wherein the dowel pints are attached to the elastic frame, and the optical film is disposed on top of the waveguide, wherein corners of the optical film is provided with openings with which the optical films are readily positioned with respect to the waveguide by extending the dowel pins through the openings; and
   wherein the strength of the dowel pins is stronger than the strength of the elastic frame; and
   wherein there are four elastic frames arranged with respect to the corners of the waveguide, and each of the elastic frames has an L-shaped configuration to match the corner of the waveguide.

6. The backlight module as recited in claim 5, wherein the elastic frame is defined with alignment holes in which the dowel pins are interferentially rooted.

7. The backlight module as recited in claim 5, wherein the elastic frame is defined with plurality of slots in a surface facing the waveguide.

8. The backlight module as recited in claim 5, wherein the elastic frame is a rubber frame.

9. The backlight module as recited in claim 5, wherein the dowel pin is made from stainless steel, or aluminum, or aluminum alloy, copper or iron.

10. The backlight module as recited in claim 5, wherein the optical film is provided with tabs corresponding to the dowel pin, and the opening is defined in the tab.

11. A liquid crystal display device, comprising:
    a display panel;
    a backlight module disposed under the display panel, and including:
    a waveguide, an optical film, an elastic frame, and dowel pins;
    wherein at least corners of the optical film is securely attached to the elastic frame;
    wherein the dowel pints are attached to the elastic frame, and the optical film is disposed on top of the waveguide, wherein corners of the optical film is provided with openings with which the optical films are readily positioned with respect to the waveguide by extending the dowel pins through the openings; and
    wherein the strength of the dowel pins is stronger than the strength of the elastic frame; and
    wherein there are four elastic frames arranged with respect to the corners of the waveguide, and each of the elastic frames has an L-shaped configuration to match the corner of the waveguide.

12. The liquid crystal display device as recited in claim 11, wherein the elastic frame is defined with alignment holes in which the dowel pins are interferentially rooted.

13. The liquid crystal display device as recited in claim 11, wherein the elastic frame is defined with plurality of slots in a surface facing the waveguide.

* * * * *